United States Patent
Gottemoller et al.

(10) Patent No.: US 7,051,720 B2
(45) Date of Patent: May 30, 2006

(54) ENGINE WITH CHARGE AIR-COOLING SYSTEM WITH WATER FUMIGATION

(75) Inventors: Paul Gottemoller, Palos Park, IL (US); Michael B. Goetzke, Orland Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 10/956,645

(22) Filed: Oct. 1, 2004

(65) Prior Publication Data

US 2006/0070380 A1   Apr. 6, 2006

(51) Int. Cl.
F02B 29/04 (2006.01)
F02B 37/00 (2006.01)
F02B 47/00 (2006.01)
F02M 25/28 (2006.01)

(52) U.S. Cl. ............ 123/563; 60/619; 123/25 A; 123/25 B; 123/25 D; 123/25 J

(58) Field of Classification Search ................ 123/563, 123/25 R–25 Q; 60/619
See application file for complete search history.

(56) References Cited

U.S. PATENT DOCUMENTS

| | | | | |
|---|---|---|---|---|
| 4,960,080 A * | 10/1990 | O'Neill et al. | ............ | 123/25 A |
| 5,657,630 A * | 8/1997 | Kjemtrup et al. | ............ | 123/563 |
| 5,718,194 A * | 2/1998 | Binion | ............ | 123/25 C |
| 5,809,981 A * | 9/1998 | Berg-Sonne | ............ | 123/563 |
| 6,003,500 A * | 12/1999 | Packard et al. | ............ | 123/563 |
| 6,035,834 A * | 3/2000 | Packard et al. | ............ | 123/563 |
| 6,082,311 A * | 7/2000 | Collin | ............ | 60/599 |
| 6,138,647 A * | 10/2000 | Packard et al. | ............ | 123/563 |
| 6,145,498 A * | 11/2000 | Packard et al. | ............ | 123/563 |
| 6,405,686 B1 * | 6/2002 | Wettergard | ............ | 60/599 |
| 6,817,348 B1 * | 11/2004 | Wettergard et al. | ...... | 123/559.1 |
| 6,883,325 B1 * | 4/2005 | Chomiak | ............ | 60/618 |
| 2005/0161009 A1 * | 7/2005 | Hupli et al. | ............ | 123/25 E |

* cited by examiner

*Primary Examiner*—Sheldon J Richter
(74) *Attorney, Agent, or Firm*—Cook, Alex, McFarron, Manzo, Cummings & Mehler, Ltd.

(57) ABSTRACT

An engine charge air-cooling system with water fumigation for an internal combustion engine includes a charge air cooler having a housing, a heat exchanger core, an air inlet and an air outlet. The charge air cooler inlet is connected to an outlet of a compressed air source, such as a turbocharger, through a cooler intake header. The charge air cooler outlet is connected through a cooler outlet header to cylinder intake ports of the engine. The cooler intake header is adapted to receive water in a passage below the cooler inlet. Hot, compressed charge air entering the charge air cooler through the intake header mixes with water vapor formed in the header, thereby humidifying the charge air that enters the cylinders from the charge air cooler. The high, energy absorbing capability of the water molecule reduces the peak combustion temperature, thereby reducing NOx production in the combustion reaction.

6 Claims, 2 Drawing Sheets

ENGINE WITH CHARGE AIR-COOLING SYSTEM WITH WATER FUMIGATION

TECHNICAL FIELD

This invention relates to internal combustion engines and, more particularly, to an engine including a charge air-cooling system with water fumigation.

BACKGROUND OF THE INVENTION

It is known in the art relating to internal combustion engines to add water to the engine combustion process in order to reduce nitrogen oxide ($NO_x$) emissions. The high, energy absorbing capability of the water molecule reduces the peak combustion temperature, thereby reducing $NO_x$ production in the combustion reaction. There are generally two known methods of adding water to the combustion process. Water may be added either by fumigating the charge air with water before it enters the cylinder or by injecting water directly into the cylinder. More specifically, this may be achieved by spraying water into the turbocharger compressor inlet or by spraying water into the intake manifold.

Regulations controlling emissions of nitrogen oxides ($NO_x$) are becoming increasingly difficult to meet. As the need for combustion engines that produce less emission gases rises, the need for new and improved methods of adding water to the combustion process to reduce $NO_x$ emissions also increases.

SUMMARY OF THE INVENTION

The present invention provides an improved apparatus for adding water to the combustion process whereby water is added by fumigation of charge air in a charge air cooler prior to combustion in the cylinder. The improved fumigation device was developed for a turbocharged diesel engine designed primarily for use in railway locomotives but also usable for other vehicle and stationary applications. The inventive concepts of the design, however, are applicable to other engine configurations and applications. The inventive concepts merely require that the engine include a charge air cooler located between a compressed air source, such as a turbocharger compressor, and the engine combustion chambers.

A charge air-cooling system with water fumigation in accordance with the present invention includes a charge air cooler connected between a compressed air source, typically a turbocharger compressor, and the combustion chambers within cylinders of an engine. The charge air cooler may include a housing internally mounting a heat exchanger core between an air inlet and an air outlet. An intake header mounted along the bottom of the housing communicates the air inlet with an air outlet of the turbocharger. The housing air outlet is connected through a cooler outlet header, acting as an intake manifold, to intake ports of associated cylinders of the engine.

The intake header is adapted to receive water through a suitable water feed source. Hot, compressed charge air entering the charge air cooler mixes with water vapor formed above the water in the duct-like header, thereby humidifying the charge air that enters the combustion chambers from the charge air cooler.

In a preferred embodiment, the charge air leaving the charge air cooler via the air outlet may be at or near 100 percent humidity. The charge air-cooling system may also include a sensor to control the level of water in the duct and the compressed air source may be a turbocharger.

These and other features and advantages of the invention will be more fully understood from the following description of certain specific embodiments of the invention taken together with the accompanying drawings.

DESCRIPTION OF THE PREFERRED EMBODIMENT

Figure 1:
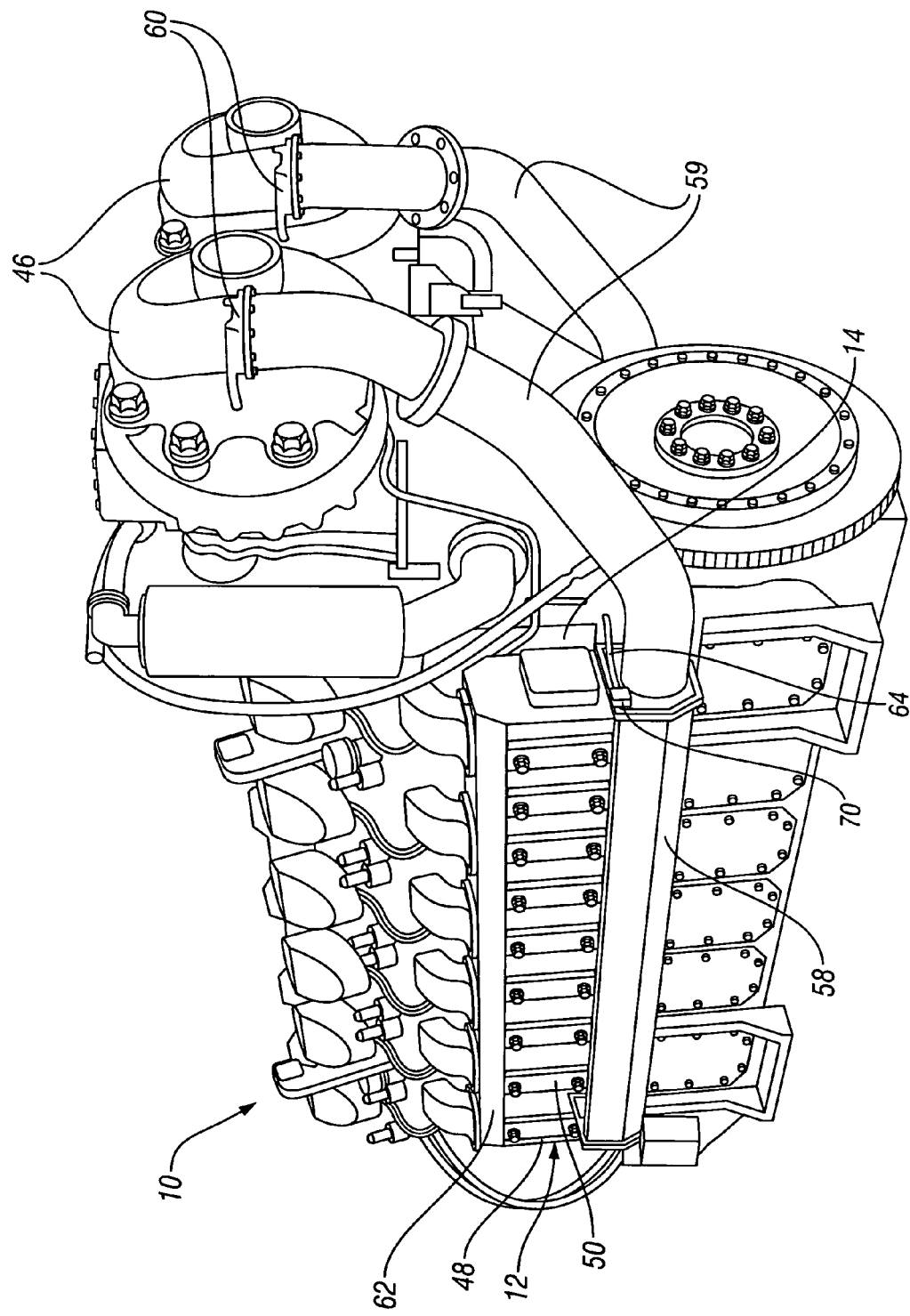
FIG. 1 is a perspective view of a turbocharged diesel engine including a charge air-cooling system with water fumigation in accordance with the present invention.
Figure 2:
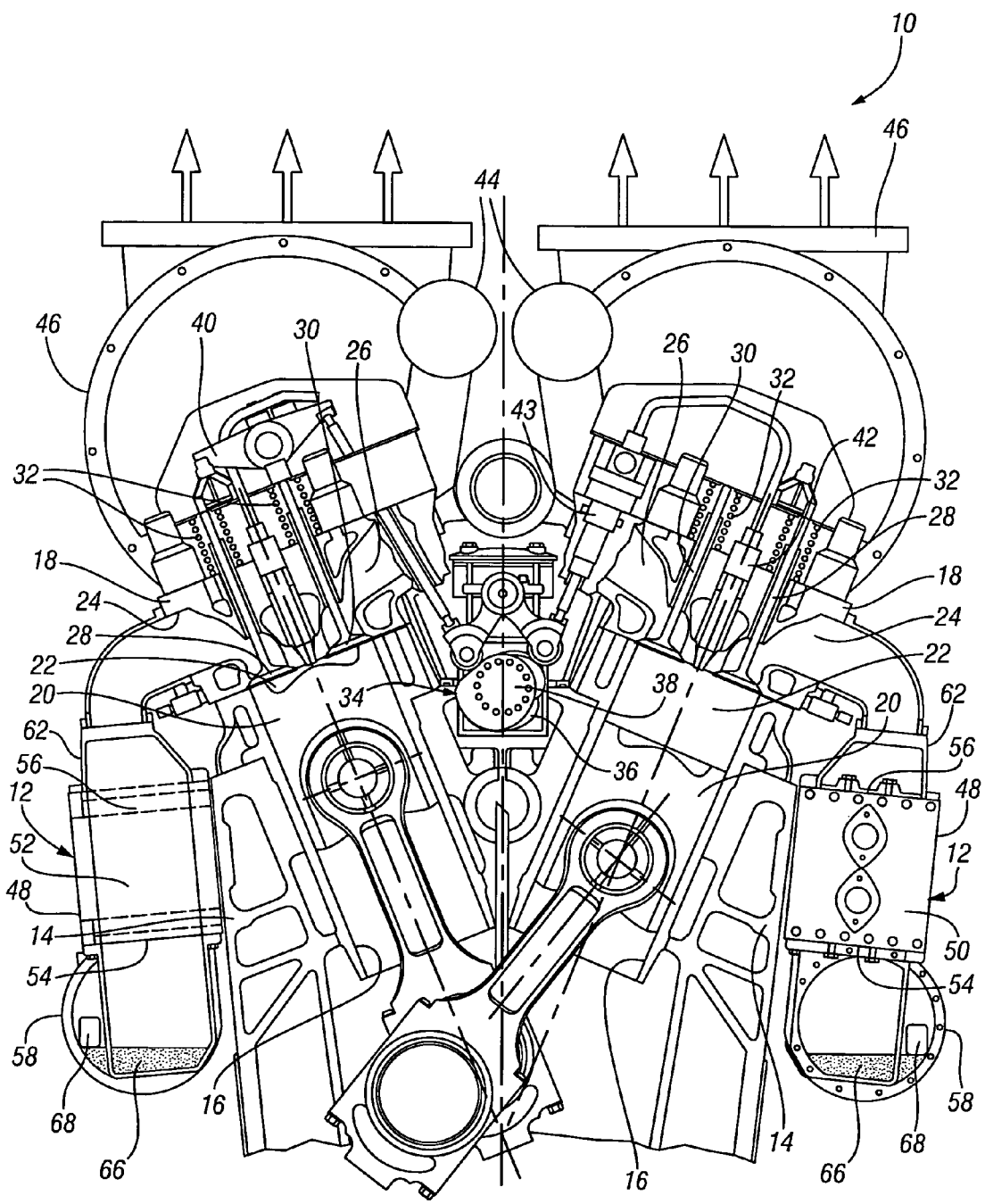
FIG. 2 is a transverse cross-sectional view of the embodiment of FIG. 1.

Referring now to FIGS. 1 and 2 of the drawings in detail, numeral 10 generally indicates a turbocharged diesel engine designed for railway locomotive applications but usable in other applications, such as marine power and mobile and stationary power plants. Engine 10 includes an optimized engine charge air-cooling system with water fumigation 12 in accordance with the present invention. Charge air-cooling system 12 reduces engine $NO_x$ production by way of a novel water fumigation system for adding water vapor to the engine combustion process.

The engine 10 has two cylinder banks 14, each having a plurality of cylinders 16 closed by cylinder heads 18. Pistons 20, reciprocable within the cylinders, define variable volume combustion chambers 22 between the pistons 20 and cylinder heads 18. The cylinder heads 18 contain intake and exhaust ports 24, 26, respectively, that communicate with the engine combustion chambers.

The ports are controlled by intake and exhaust valves 28, 30, respectively, which are mounted in the cylinder heads and biased by valve springs 32. The valves 28, 30 are mechanically actuated by intake and exhaust cams 34, 36, respectively, of a camshaft 38 driving associated valve actuating mechanisms such as intake rocker arms 40. Fuel injection valves 42 are pressure actuated by camshaft driven injection pumps 43. The exhaust ports 26 are connected to exhaust manifolds 44, which are in turn connected to turbochargers 46.

In a preferred embodiment of the present invention, the charge air-cooling system 12 includes a pair of charge air coolers 48 (aftercoolers) that are side mounted, one on each of the outboard sides of the cylinder banks 14 of the twelve cylinder V-type engine 10. As illustrated in FIG. 1, each charge air cooler extends along the full length of its associated cylinder bank 14. The charge air cooler 48 includes a housing 50 and a continuous heat exchanger core 52 extending the full length within the housing. The core 52 is preferably fixed at one end to the housing 50 and free floating along its length on supports in the housing. The charge air cooler core 52 may be arranged on the coolant side as a four pass cross flow heat exchanger.

Each charge air cooler housing 50 includes an open bottom forming an air inlet 54 and an open top forming an air outlet 56. An intake header 58 is mounted to the bottom of the housing 50 and communicated through the air inlet 54 with its cooler core 52. The header 58 connects through a connecting duct 59 with an air outlet 60 of a compressed air source, in this case a turbocharger 46. The charge air cooler air outlet 56 is connected to a cooler outlet header. The cooler outlet header 62, acting as an engine intake manifold, is mounted to the top of the charge air cooler housing 50 and communicates the cooler core 52 with the cylinder intake ports 24. The intake header 58 is adapted to receive water through a suitable water feed source, such as water supply means 64. In use, water 66 is contained along the bottom of the header 58. A sensor 68 may be located in the header, which, in combination with a control device 70, controls the level of water 66 in the header 58.

The engine cycle conventionally includes intake, compression, expansion and exhaust strokes of the pistons. Intake charges drawn into the combustion chambers 22 from the cylinder intake ports 24 on the intake strokes are compressed with the valves closed. Fuel injected into the combustion chambers 22 is ignited by the hot, compressed gases, and the combustion products expand as the pistons move downward, producing power. High combustion temperatures in the combustion chambers undesirably cause formation of nitrogen oxides ($NO_x$).

The combustion products are exhausted through the exhaust ports 26 and exhaust manifolds 44 to the turbochargers 46, providing energy to the turbochargers to boost the pressure of the intake charges. The engine pistons draw air into their respective combustion chambers on their intake strokes. At higher engine loads, the turbochargers 46 draw in additional charge air and compress the air, thereby heating it. The pressurized (compressed) charge air is delivered through the turbocharger air outlets 60, connecting ducts 59, if used, and intake headers 58 to the charge air cooler housing air inlets 54. Charge air then passes through the heat exchanger cores 52 and exits through the charge air cooler housing outlets 56. Finally, the charge air passes through the cooler outlet headers 62 to the cylinder intake ports 34 at pressures varying with engine operating conditions.

In operation, the present charge air-cooling system with water fumigation reduces the production of $NO_x$ by adding water to the charge air prior to the air entering the cylinder intake ports. Hot, compressed charge air from the turbochargers 46 enters the intake headers 58 of the charge air coolers 48. The charge air cooler cores are heat exchangers, which may have on the water side a four pass cross flow heat exchanger arrangement in which the charge air passes serially through four passes of the water tubes, each pass carrying cooler water than the pass before it.

Water 66 is added as needed to the headers 58 and is spread along the bottoms of the intake headers 58 by gravity, assisted if necessary by suitable means, such as baffles to maintain water along the bottoms of the headers. The level of water 66 in the bottoms of the headers 58 may be controlled with a sensor 68 and a control device 70. The water 66 is exposed to the hot, compressed charge air supply coming from the turbochargers 46. At full engine load down to approximately 65 percent load, the temperature of the charge air is above the pressure compensated water boiling temperature. This causes the water 66 to boil and water vapor to form above the liquid water.

The charge air passing through the air intake headers 58 mixes with and carries the water vapor up into the charge air cooler cores 52 through the air inlets 54 of the charge air cooler housings 50. As the charge air/water vapor mixture flows up through the cores 52, heat exchange with the cores lowers the temperature of the air/water mix. In passing through the heat exchanger, the charge air temperature drops by approximately 95 percent of the temperature difference between the compressor discharge temperature and the coolant inlet temperature.

The temperature drop results in condensation forming on fins of the heat exchangers. The condensation accumulates and drips back into the water 66 in the intake headers 58. This process causes the charge air leaving the charge air cooler core 52 through the air outlets 56 to be close to 100 percent humidity, achieving the goal of maximizing humidity without having excess water drop out in the intake ports 24 of the cylinder heads 18. The humidified charge air then enters the combustion chambers 22 through the intake ports 24 via the charge air cooler outlet headers 62. This unique use of a charge air-cooling system to add water to engine charge air reduces the levels of $NO_x$ produced by the engine by adding water to the engine combustion reaction to lower peak combustion temperatures.

In summary, the invention emphasizes the following features:
locating water at a charge air cooler air inlet;
humidifying the charge air in a charge air cooling system;
utilizing a water boiling/condensation process to humidify the charge air; and
maximizing the percent humidity of the engine charge air so as to obtain a reduction in the amount of $NO_x$ gases produced by the engine.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. An internal combustion engine comprising:
at least one cylinder bank;
a plurality of cylinders in said cylinder bank;
a cylinder intake port connected to each of said cylinders;
a compressed air source connected to said intake ports;
at least one charge air cooler including a housing, a heat exchanger core, an air inlet, and an air outlet;
said charge air cooler housing side mounted along a side of said cylinder bank;
said charge air cooler air inlet being connected to an outlet of said compressed air source through an intake header;
said charge air cooler air outlet being connected to said cylinder intake ports; and
said charge air cooler further including a cooler intake header adapted to receive water on a bottom of the header in open communication with the heat exchanger core.

2. The engine of claim 1 including a sensor located in said intake header and adapted to monitor an amount of water in said header.

3. The engine of claim 1 wherein said charge air cooler core is a four pass cross flow heat exchanger.

4. The engine of claim 1 wherein said compressed air source is a turbocharger.

5. An engine charge air-cooling system adapted for water fumigation, said system comprising:
a charge air cooler connectable between a compressed air source and a plurality of cylinder intake ports of an internal combustion engine;
said charge air cooler including a housing, a heat exchanger core, an air inlet, an air outlet;
an intake header connected with the housing inlet and having a bottom below said air inlet and adapted to receive water thereon and forming a passage for a flow of intake charge air through the air inlet to the heat exchanger core to humidify hot compressed charge air delivered through the passage; and a sensor located in relation to said header and adapted to monitor an amount of water in said duct.

6. The engine charge air-cooling system of claim 5 wherein said compressed air source is a turbocharger.

* * * * *